United States Patent Office 3,292,625
Patented Dec. 20, 1966

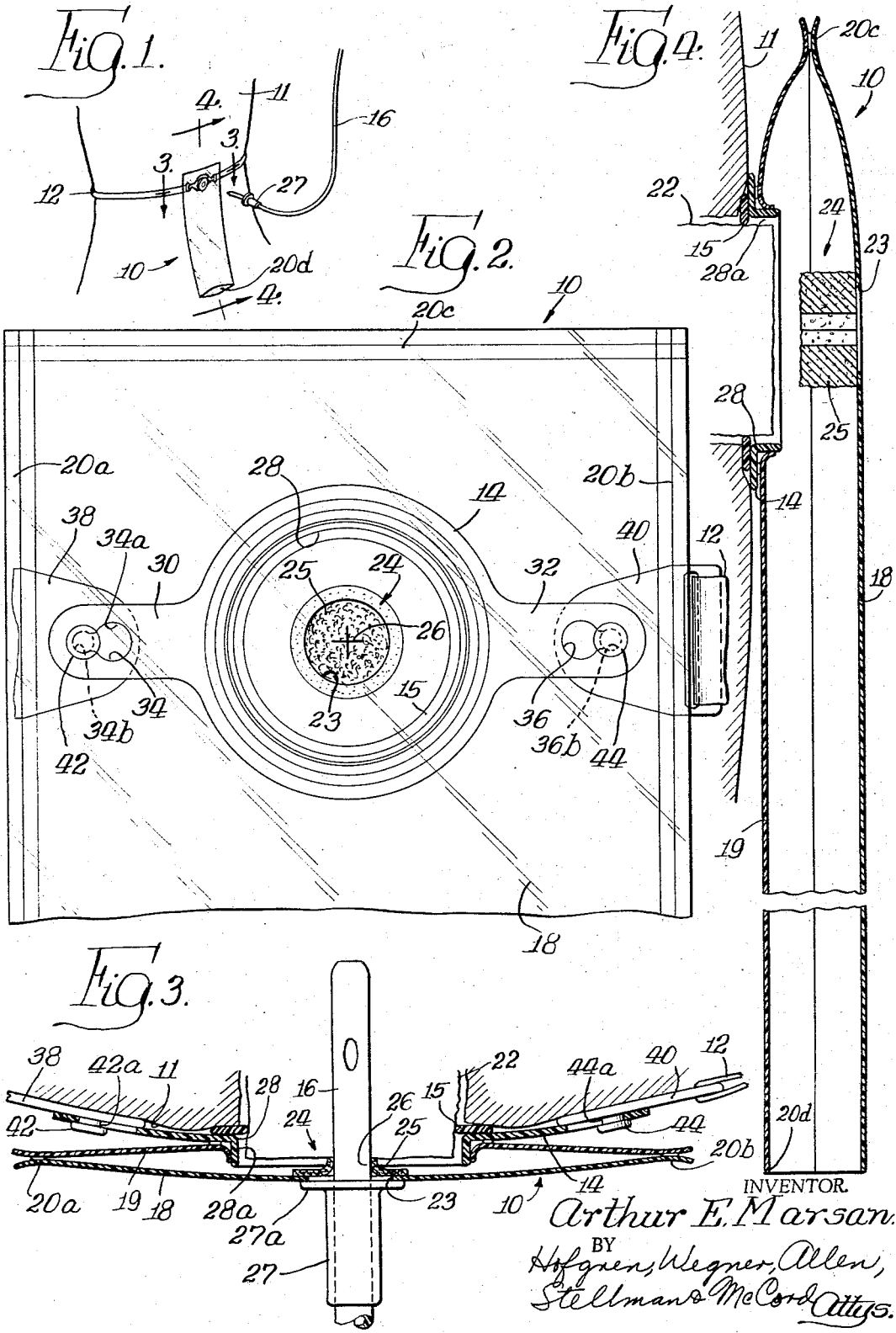

3,292,625
POST-SURGICAL IRRIGATION APPLIANCE
Arthur E. Marsan, Chicago, Ill., assignor to Hollister, Incorporated, a corporation of Illinois
Filed May 15, 1964, Ser. No. 367,644
9 Claims. (Cl. 128—283)

This invention relates to post-surgical irrigation appliances or pouches and more particularly to an irrigating appliance of the type disclosed in my U.S. Patent No. 2,928,393.

The present invention is an improvement over the aforementioned patent in that it provides a disposable irrigating appliance device having an improved sealing structure.

It is the primary object of my invention to provide a new and improved post-surgical irrigating appliance having an improved sealing means for the catheter opening.

It is yet another object of this invention to provide a new and improved post-surgical irrigating appliance having means for sealing the catheter opening which means improves with contact with the fluids expelled from the patient.

It is yet a further object of this invention to provide a new and improved post-surgical irrigation appliance having means for sealing the opening through which the catheter is inserted, which means is effective during positioning of the catheter in the opening and remains effective after the catheter is withdrawn to completely seal the catheter opening.

Other objects and advantages will be readily apparent from the following detailed description taken in connection with the accompanying drawings; in which:

FIGURE 1 is a fragmentary view of the abdominal section of the human torso showing a post-surgical irrigating appliance in use;

FIGURE 2 is an enlarged fragmentary view of the irrigating appliance shown in FIGURE 1;

FIGURE 3 is an enlarged fragmentary horizontal section view taken along the line 3—3 of FIGURE 1; and FIGURE 4 is an enlarged fragmentary section view taken along the line 4—4 of FIGURE 1.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Referring now to the drawings, in FIGURE 1 there is shown a post-surgical irrigation appliance 10 secured to the torso 11 by means of a belt 12. The irrigation appliance is provided with a backing portion 14 and may, in selected cases, be sealed to the torso with the aid of a medicinal sealing pad or gasket 15. A catheter tube 16 may be inserted in the wall of the appliance for irrigating purposes. The catheter is connected to a source of water, such as an enema bag (not shown).

The irrigation appliance is provided with a front and back panel 18 and 19, respectively, and is sealed about the sides at 20a and 20b, and at the top 20c. The bottom 20d is open so that, when the user is positioned over a toilet, fecal discharge which has flowed in response to the irrigation fluids fed through said catheter, may pass through the open end of the appliance and drop into the toilet.

The appliance is preferably made of a sheet-like plastic waterproof material. It is provided with a centrally disposed stoma opening 21 in the back panel near the top of the appliance for receiving the stoma 22 of the patient.

Opposite the stoma opening there is provided, in the front panel, a catheter opening 23 through which the catheter may be telescoped and inserted into the stoma.

The inside of the front panel about the catheter opening is provided with the sealing means 24 of this invention. The sealing means 24 comprises a compressed cellulose sponge, such as that commercially known as "super cell" which is heat sealed to the inside of the front panel adjacent the catheter opening. The nature of the sponge is such that when dry it is extremely thin, but when exposed to moisture it expands greatly as the moisture is absorbed. The sponge is provided with a normally closed catheter passage comprising cross-like slits 26 which are in registry with the catheter opening and which will yield in response to the thrust of the catheter therethrough, as shown in FIGURE 3.

The catheter is provided with a hard plastic sleeve 27 having an enlarged disc-like radially projecting flange 27a at one end thereof. The sleeve fits snugly about the periphery of the catheter so as to be slidable along the longitudinal extent of the catheter and be substantially self-locking in any position of adjustment. The distal end of the catheter is inserted into the stoma a suitable length, such as six to twelve inches in the case of insertion into a large intestine. Once the selected distance of insertion has been reached, the sleeve is moved along the length of the catheter to a position abutting the back panel adjacent the sealing means to provide a rigid backing therefor as well as an additional sealing structure which hugs the periphery of the catheter. The sponge element itself affords a suitable sealing structure by itself but the combination of the sponge and sleeve on the catheter, when the catheter is inserted through the sponge, insures that back flow of even the most minute amount of water is sealed against. This is extremely desirable since an important object in irrigating is to get as much water as possible in the bowels and to hold it there as long as possible to break up the fecal matter.

When the catheter has been inserted through the sponge seal and irrigation begins, moisture will contact the sponge, causing the sponge to expand greatly in depth and tightly hug the periphery of the catheter to create a seal therearound for preventing back flow of irrigation fluid through the catheter opening. When a sufficient quantity of fluid has been supplied by means of the irrigation, the catheter is removed to accommodate the initiation of discharge from the patient. Drainage fluid from the patient will come in contact with the sponge, further expanding the sponge. As shown in FIGURE 4, after the catheter has been removed, the slits in the now wet, greatly expanded sponge are sealed to close the catheter opening. Thus, back flow of irrigation water as well as fecal discharge or other drainage are sealed against, and there is left only one avenue for disposal of such material, through the open bottom of the appliance and into a toilet.

Backing member 14 is provided with an opening 28 adjacent the stoma opening having an inwardly directed smooth flange surface 28a for loosely embracing the stoma in a nonirritating fashion. The outer portion of the retainer is provided with two laterally projecting ears 30 and 32 having openings 34 and 36, respectively, in either end thereof. The openings 34 and 36 are provided with an enlarged portion 34a and 36a, respectively, and a reduced diameter portion 34b and 36b, respectively. The belt is provided with two generally flat end portions 38 and 40 each having a post 42 and 44, respectively, projecting outwardly from one face thereof. The post is provided with a reduced neck portion 42a and 44a, respectively, so that the post may be inserted through the enlarged portion of the openings in the ears and then, as the belt moves laterally, the reduced neck portion may be caught in a smaller diameter portion of the ear openings to fasten the appliance to the belt and secure the same to the patient.

The irrigation bag of this invention provides a new and improved sealing structure preventing back flow of irrigating fluid as well as fecal discharge through the catheter opening so that such material will be properly drained through the bottom of the bag into an appropriate receptacle. The sealing structure is such that it not only effectively seals while the catheter is in position, but closes off the catheter opening in the bag as well as the opening in the seal itself once the catheter has been withdrawn. Since the sealing structure is primarily a thin disc of sponge material, it is extremely inexpensive and can be formed with the bag by heat sealing during manufacture of the bag, rendering the complete structure so inexpensive it can be disposed of after a single use, promoting economy as well as sanitation.

I claim:

1. A post-surgical irrigating appliance, comprising: a sheet-like bag of waterproof material having an inner and outer wall, the bag being open at the bottom; a stoma opening on the inner wall of the bag for telescoping over the stoma of a patient; means for holding the bag in position on a patient; a catheter opening in the outer wall in registration with the stoma opening in the inner wall, said outer wall opening being of sufficient size for receiving a catheter tube to be inserted through the outer wall and into a stoma of a patient for irrigation purposes; and sealing means in the path of catheter insertion, said sealing means including a material which expands greatly when subjected to moisture so that when said catheter is inserted into said opening and through said sealing means, irrigation fluid coming into contact with said sealing means will cause said sealing means to expand greatly into sealing engagement with the catheter and after said catheter is removed, said sealing means will expand further to close the opening through which the catheter was inserted to provide a continuous seal against drainage and fecal discharge.

2. The appliance of claim 1 wherein said sealing means is positioned on the inner face of the outer wall of the appliance over the catheter opening.

3. The appliance of claim 1 wherein said sealing means is secured to the interior of said bag by heat sealing when the bag is formed.

4. The appliance of claim 1 wherein said sealing means has slits to provide a catheter opening therethrough which circumscribes the catheter when the catheter is inserted and expands into sealing engagement with the catheter when subjected to moisture and expands further and completely closes the catheter opening when the catheter is withdrawn.

5. The appliance of claim 4 wherein the sealing means comprises compressed sponge-like material.

6. A post-surgical irrigating appliance for use with an irrigation catheter, comprising: a sheet-like bag of waterproof material having an inner and outer wall, the bag being open at the bottom; a stoma opening on the inner wall of the bag for telescoping over the stoma of a patient; means for holding the bag in position on a patient; a catheter opening in the outer wall in registration with the stoma opening in the inner wall, said outer wall opening being of sufficient size for receiving a catheter tube to be inserted through the outer wall and into a stoma of a patient for irrigation purposes; and sealing means including a sleeve on said catheter and a material in the path of catheter insertion which expands greatly when subjected to moisture so that when said catheter is inserted into said opening and through said sealing means with said sleeve against the exterior of the bag adjacent the expandable material, irrigation fluid coming into contact with said sealing means will cause said expandable material to expand greatly into sealing engagement with the catheter and after said catheter is removed, said expandable material will expand further to close the opening through which the catheter was inserted to provide a continuous seal against drainage and fecal discharge.

7. The irrigating appliance of claim 6 wherein said sleeve is movable relative to the catheter so that the sleeve may be positioned adjacent the exterior of the bag for any distance of insertion of the catheter.

8. The irrigating appliance of claim 6 wherein the sleeve is provided with a disc-like flange at one end to be positioned adjacent the expandable material to afford a backing therefor which aids in sealing against leakage when the catheter is inserted into the opening.

9. The irrigating appliance of claim 8 wherein said sealing means is heat sealed to the inner face of the outer wall of the appliance over the catheter opening.

References Cited by the Examiner

UNITED STATES PATENTS

| 2,741,247 | 4/1956 | Marsan | 128—283 |
| 2,928,393 | 3/1960 | Marsan | 128—283 |
| 2,973,759 | 3/1961 | Plymale | 128—283 |

RICHARD A. GAUDET, *Primary Examiner.*

L. W. TRAPP, *Assistant Examiner.*